United States Patent
Inagawa et al.

(10) Patent No.: US 7,170,536 B2
(45) Date of Patent: Jan. 30, 2007

(54) LIGHT BEAM SCANNING APPARATUS AND IMAGE FORMING APPARATUS

(75) Inventors: Yuji Inagawa, Numazu (JP); Koji Tanimoto, Tagata-gun (JP); Kenichi Komiya, Kawasaki (JP); Daisuke Ishikawa, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 333 days.

(21) Appl. No.: 10/933,416

(22) Filed: Sep. 3, 2004

(65) Prior Publication Data

US 2006/0050139 A1    Mar. 9, 2006

(51) Int. Cl.
B41J 2/447      (2006.01)
H01S 5/068     (2006.01)
H01S 5/0683   (2006.01)

(52) U.S. Cl. ..................... 347/133; 347/236
(58) Field of Classification Search ............... 347/129, 347/130, 131, 132, 133, 233, 236, 23
See application file for complete search history.

(56) References Cited

U.S. PATENT DOCUMENTS 6,549,265 B1 * 4/2003 Sakakibara et al. ........... 355/35

FOREIGN PATENT DOCUMENTS

JP    9-164722 A    6/1997
JP    2001-88344 A  4/2001
JP    2003-39724 A  2/2003

OTHER PUBLICATIONS

U.S. Appl. No. 10/805,531, filed Mar. 22, 2004, Komiya et al.

* cited by examiner

*Primary Examiner*—Huan Tran
(74) *Attorney, Agent, or Firm*—Foley & Lardner LLP (57) ABSTRACT

A beam detection sensor detects power of a laser beam from one of a plurality of light sources for each scanning of a scanning section to provide a light power signal. A laser control circuit compares a value of the light power signal with a predetermined value, adjusts a terminal voltage of a capacitor based on a result of the comparison, controls emission power of one of the light sources in accordance with the terminal voltage of the capacitor, and executes the control once for each light source during a plurality of scanning operations. An APC correction circuit corrects a reduction in the power of a laser beam in accordance with a reduction in electric charges applied to the capacitor caused by a leakage current during the plurality of scanning operations.

19 Claims, 7 Drawing Sheets

| APC correction circuit a [V] |
|---|
| Vwmoda : 0.000 |
| Vwmodb : 0.010 |
| Vwmodc : 0.019 |
| Vwmodd : 0.031 |
| |
| Vbmoda : 0.000 |
| Vbmodb : 0.012 |
| Vbmodc : 0.021 |
| Vbmodd : 0.029 |

| APC correction circuit b [V] |
|---|
| Vwmoda : 0.030 |
| Vwmodb : 0.000 |
| Vwmodc : 0.009 |
| Vwmodd : 0.022 |
| |
| Vbmoda : 0.031 |
| Vbmodb : 0.000 |
| Vbmodc : 0.012 |
| Vbmodd : 0.018 |

| APC correction circuit c [V] |
|---|
| Vwmoda : 0.019 |
| Vwmodb : 0.031 |
| Vwmodc : 0.000 |
| Vwmodd : 0.012 |
| |
| Vbmoda : 0.020 |
| Vbmodb : 0.029 |
| Vbmodc : 0.000 |
| Vbmodd : 0.012 |

| APC correction circuit d [V] |
|---|
| Vwmoda : 0.009 |
| Vwmodb : 0.020 |
| Vwmodc : 0.031 |
| Vwmodd : 0.000 |
| |
| Vbmoda : 0.011 |
| Vbmodb : 0.019 |
| Vbmodc : 0.030 |
| Vbmodd : 0.000 |

FIG. 7

LIGHT BEAM SCANNING APPARATUS AND IMAGE FORMING APPARATUS

BACKGROUND OF THE INVENTION

Conventionally, in an image forming apparatus such as a digital copying machine that uses a semiconductor laser as a light source, a surface of an image carrier has been subjected to exposure scanning by a line unit to form an electrostatic latent image. To maintain constant emission power of the semiconductor laser in an image area, emission power stabilization control (generally called Auto Power control; abbreviated to APC hereinafter) has been carried out.

According to the APC, power of a laser beam is detected by a photodiode incorporated in the semiconductor laser, or a photodiode externally, and a laser beam is emitted by desired power in accordance with a detected current from the photodiode. Specifically, first, a predetermined current is supplied to the semiconductor laser, and power of an emitted laser beam therefor is detected as a current by the photodiode. The detected current is converted into a voltage, and a voltage value (detected voltage Vm) after the conversion is compared with a voltage value (reference voltage Vref) for desired emission power. If the detected voltage Vm is larger than the reference voltage Vref, electric charges are discharged from a reference capacitor. If the detected voltage Vm is smaller than the reference voltage Vref, electric charges are applied to the reference capacitor. A current is supplied to the semiconductor laser in accordance with a terminal voltage of the reference capacitor. As a result, the detected voltage Vm is adjusted to be equal to the reference voltage Vref, and the power of a laser beam is maintained constant.

Additionally, the APC is classified into two: a bias APC (BAPC) which controls a bias current equal to/less than a laser emission threshold value, and a write APC (WAPC) which controls a switching current of laser emission turned ON/OFF in accordance with image data.

Jpn. Pat. Appln. KOKAI Publication No. 9-164722 discloses a technology which shortens a time necessary for APC during one scanning by executing APC of one light source during one scanning and APC of a plurality of light sources over a plurality of scanning operations in an apparatus which has the plurality of light sources.

However, the technology of the Publication has problems. That is, in a certain light source, emission power of a light during the scanning in which no APC is executed is smaller compared with that during the scanning in which APC is executed. This is caused by drooping, i.e., a leakage current, of a capacitor which holds a voltage value to decide emission power.

Normally, a leakage current of the holding capacitor is sufficiently small with respect to one scanning cycle. However, in the case of using a laser array which has many light sources, an influence of a leakage current can no longer be ignored. Consequently, density nonunifoirmity occurs between the scanning in which the APC is executed and the scanning in which no APC is executed.

BRIEF SUMMARY OF THE INVENTION

It is an object of the present invention to suppress density nonunifoirmity by reducing an influence of a leakage current even when APC of one light source is executed during one scanning in a plurality of scanning operations, and APC of a plurality of light sources is executed over a plurality of scanning operations in an image forming apparatus which comprises the plurality of light sources.

In order to achieve the above object, according to one aspect of the present invention, there is provided a light beam scanning apparatus comprising: a plurality of light sources which generate laser beams, respectively; a detection sensor which detects power levels of the respective laser beams of the plurality of light sources; a light power detection circuit which provides the light power levels detected by the detection sensor as detected signals; a plurality of capacitors which respectively hold voltages to decide emission power levels of the light sources; an emission power control section which compares a value of a light power signal from the light power detection circuit with a predetermined value, adjusts a terminal voltage of the corresponding capacitor based on a result of the comparison, and adjusts a driving current of each of the light sources based on the terminal voltage of the capacitor to control each emission power level of the light sources; and a correction section which corrects a reduction in light power of the light source in accordance with a reduction in electric charges applied to each capacitor during a plurality of scanning operations of the laser beam.

DETAILED DESCRIPTION OF THE INVENTION

Next, the preferred embodiments of the present invention will be described.

Figure 1:
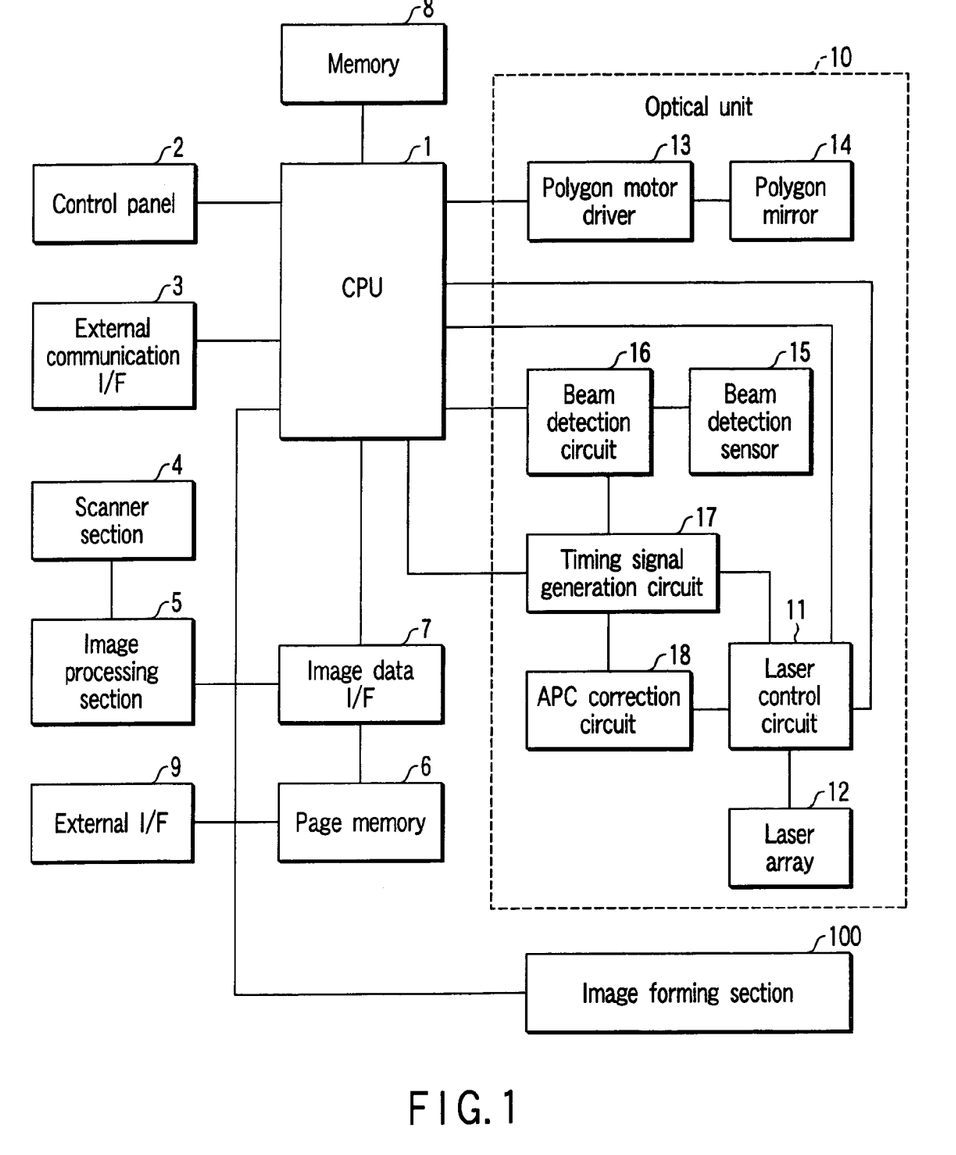
FIG. 1 is a block diagram showing an entire constitution of an image forming apparatus.

FIG. 1 is a block diagram showing an entire constitution of an image forming apparatus according to an embodiment of the present invention.

A CPU 1 controls the entire image forming apparatus in a comprehensive manner. The CPU 1 reads a document image by a scanner section 4 when there is a need to read an image for a printing request received from a user through a control panel 2 or an external communication interface (I/F) 3. The read image data is subjected to processing such as shading correction by an image processing section 5. The processed image data is stored in a page memory 6 according to a need of printing a plurality of portions or the like. The CPU 1 processes and controls the image data from the image processing section 5 through an image data I/F 7, and stores the data in a memory 8 as the occasion demands. Additionally, the CPU 1 stores data transferred from an external I/F 9 in the page memory 6. The image data stored in the page memory 6 is sent through the image data I/F 7 to a laser control circuit 11 in an optical system unit 10.

In the optical system unit 10, the power of a laser beam is detected by a beam detection sensor 15, the beam power is converted into an electric signal by a beam detection circuit 16, and a timing signal necessary for one scanning is output through a timing signal generation circuit 17. The laser beam power is controlled to a constant value by a laser control circuit 11 and an APC correction circuit 18, and a laser is turned ON/OFF in accordance with the image data sent from the CPU 1.

An image forming section includes a photosensitive drum, a developing device, a transfer device, and a fixing device. A laser beam from a laser array 12 is applied to the photosensitive drum for each image data of one line by a polygon mirror 14 driven by a polygon motor driver 13, and an electrostatic latent image is formed in accordance with turning ON/OFF of the laser. The developing device applies a developer (toner) on the latent image formed on the photosensitive drum to form a toner image. The transfer device transfers the toner image to a sheet by a transfer roller (not shown). The fixing device applies heat and pressure to the sheet to which the toner image has been transferred to form an image thereon.

Figure 2:
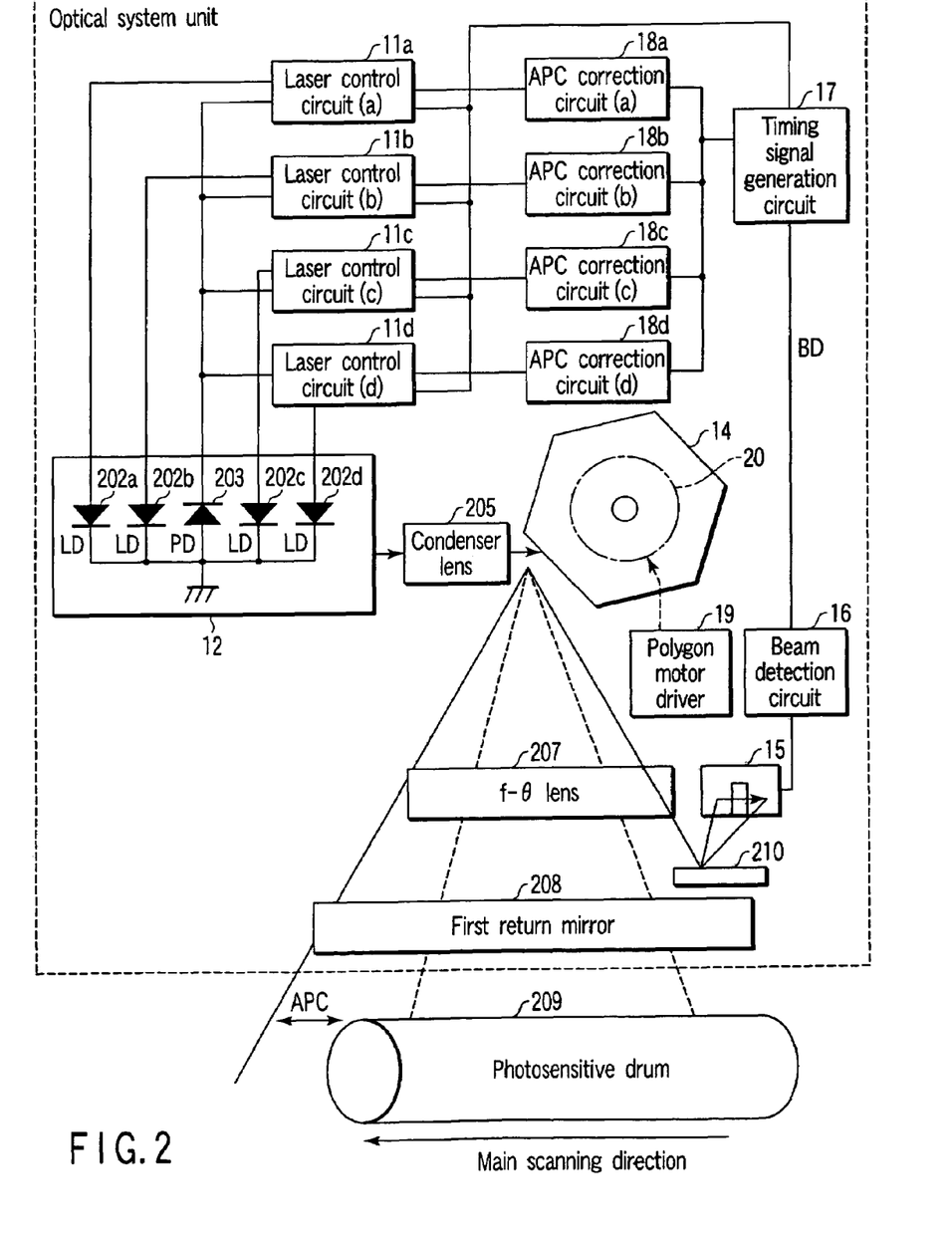
FIG. 2 is a block diagram showing a constitution of an optical system unit.

FIG. 2 shows the optical system unit 10 in detail. The laser array chip 12 is a 4-beam laser array chip, and comprises laser diodes 202a to 202d as light sources, and a photodiode 203 which monitors parts of lights output from the laser diodes. A laser beam power detected by the photodiode 203 is converted into a current, and input to laser control circuits (a to d) 11a to 11d. The laser control circuits 11a to 11d electrically detect emission states of the laser diodes 202a to 202b.

Laser beams output from the laser diodes 202a to 202d are passed through a condenser lens 205, and reflected on the polygon mirror 14 which is a scanning mirror. The polygon mirror 14 is rotated at a constant speed by a polygon motor 20 driven by a polygon motor driver 19. Thus, a reflected light from the polygon mirror 14 is reflected through an f-θ lens 207 on a first return mirror 208. Then, the reflected light is scanned and exposed as an image on the photosensitive drum 209 as image carrier to form an electrostatic latent image thereon.

A part of an optical signal passed through the f-θ lens 207 is reflected on a second return mirror 210, and input to the beam detection sensor 15. The beam detection sensor 15 generates an electric detection signal corresponding to an incident light, and supplies the signal to the beam detection circuit 16. The beam detection circuit 16 digitizes the detection signal, and generates a BD signal which is a digitized detection signal. This BD signal is used as a reference signal to obtain synchronization for each scanning.

The BD signal is input to the timing signal generation circuit 17. By this timing signal generation circuit, various APC signals necessary for APC processing are output to the laser control circuits 11a to 11d and APC correction sections 205a to 205d. Laser beam power control is carried out by the timing of these APC signals.

An image data signal is input from the CPU 1 to the laser control circuits 11a to 11d. The laser control circuits 11a to 11d supply a laser driving current turned ON/OFF (modulated) in accordance with the input image data signal to the laser diodes 202a to 202d. Accordingly, the ON/OFF of the emission of the laser diodes 202a to 202d are controlled by the laser control circuits 11a to 11d.

Figure 3:
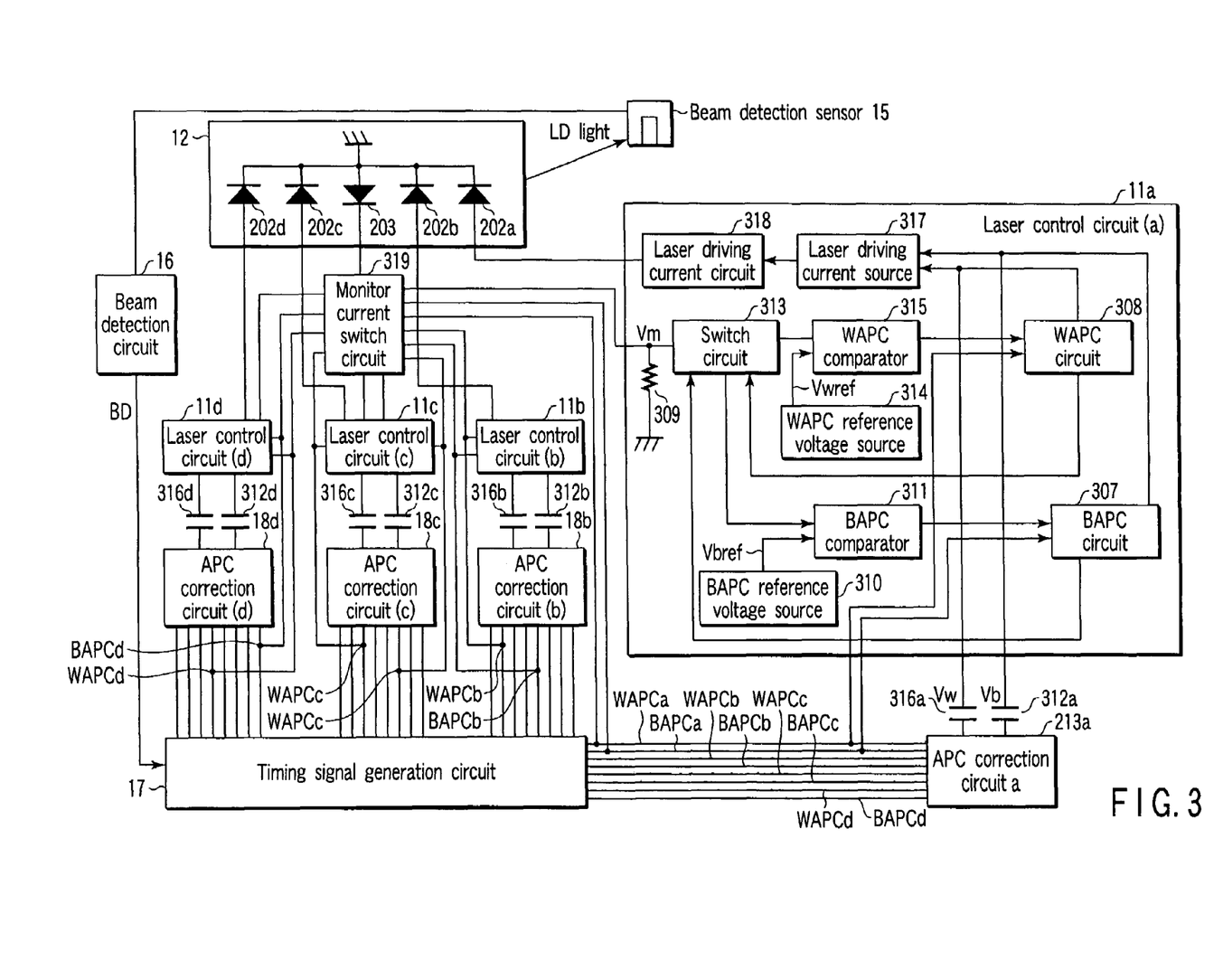
FIG. 3 is a block diagram showing a constitution of a laser control circuit and its peripheral circuit.

FIG. 3 is a block diagram showing a specific constitution of the laser control circuits 11a to 11d and a peripheral circuit thereof. Components similar to those of FIG. 2 are denoted by similar reference numerals.

The timing signal generation circuit 17 generates bias APC signals BAPCa to BAPCd and write APC signals WAPCa to WAPCd (detailed later) based on he BD signal and an internally generated clock (see FIG. 6). The BAPCa to BAPCd signals and the WAPCa to WAPCd signals are generated by one pulse for four scanning operations during a period other than the image forming period. The period of generating the APC signals corresponds to the period indicated by the APC in FIG. 2. For example, the bias APC signal BAPCa and the write APC signal WAPCa are input to the laser control circuit 11a.

<Method of Controlling Bias APC>

Hereinafter, description will be made of a method of controlling bias APC by the laser control circuit 11. A bias APC operation will be specifically described by taking an example of the laser control circuit 11a.

While the BAPCa signal is active (e.g., at a high level), a BAPC circuit 307 forcibly causes the laser diode 202a to emit a light through a laser driving current source 317 and a laser driving current circuit 318. The photodiode 203 detects a part of a laser beam thereof as a monitored light, and outputs a monitor current of an amplitude in accordance with the power thereof. The output monitor current is converted into a voltage value by a monitor current input resistor 309. Here, a monitor current switch circuit 319 is a changeover switch which connects the photodiode 203 with a switch circuit 313 in the laser control circuit 11a when one of the BAPCa signal and the WAPCa signal generated by the timing signal generation circuit 17 is input. The monitor current switch circuit 319 is omitted in FIGS. 1, 2.

The switch circuit 313 is connected to the BAPC circuit 307, and it is a changeover switch which connects the photodiode 203 with a BAPC comparator 311 when the BAPCa signal is active. A monitor voltage Vm is applied through the switch circuit 313 to the BAPC comparator 311, and compared with a BAPC reference voltage Vbref set by a BAPC reference voltage source 310. The BAPC reference voltage Vbref may be varied based on a control signal from the outside.

A comparison result of the BAPC comparator 311 is supplied to the BAPC circuit 307. The BAPC circuit 307 discharges electric charges from a BAPC holding capacitor 312a in the case of Vm>Vbref, and applies electric charges to the same in the case of Vm<Vbref. Thus, the electric charges of the BAPC holding capacitor 312a are applied/discharged in accordance with the comparison of the monitor voltage value Vm with the BAPC reference voltage value Vbref. That is, a voltage Vb of the capacitor 312a is controlled so that a bias voltage (Vm, here) to decide a bias current of the laser diode can be equal to the BAPC reference voltage Vbref.

When the BAPCa signal becomes inactive after the bias voltage has become equal to the BAPC reference voltage Vbref, the switch circuit 313 disconnects the photodiode 203 from the BAPC comparator 311. In this case, it is assumed that the active period of the BAPC signal is longer than a time necessary for controlling the bias voltage to be equal to the BAPC reference voltage Vbref by applying/discharging electric charges from the BAPC holding capacitor 312a.

<Method of Controlling Write APC>

Next, description will be made of a method of controlling write APC by taking an example of the laser control circuit 11a.

While the WAPCa signal is active, a WAPC circuit 308 forcibly causes the laser diode 202a to emit a light through the laser driving current source 317 and the laser driving current circuit 318. The photodiode 203 detects a part of a laser beam thereof as a monitored light, and outputs a monitor current in accordance with the power thereof. The output monitor current is supplied through the monitor current switch circuit 319 to the monitor current input resistor 309, and converted into a voltage value.

The switch circuit 313 is connected to the WAPC circuit 308, and connects the photodiode 203 with a WAPC comparator 315 when the WAPCa signal is active. A monitor voltage Vm is input through the switch circuit 313 to the WAPC comparator 315, and compared with a WAPC reference voltage Vwref set by a WAPC reference voltage source 314. The WAPC reference voltage Vwref may be varied based on a control signal from the outside.

A comparison result of the WAPC comparator 315 is supplied to the WAPC circuit 308. The WAPC circuit 308 discharges electric charges from a WAPC holding capacitor 316a in the case of Vm>Vwref, and applies electric charges to the same in the case of Vm<Vwref. Thus, the electric charges of the WAPC holding capacitor 316a are applied/discharged in accordance with the comparison of the monitor voltage value Vm with the WAPC reference voltage value Vwref. That is, a voltage Vw of the capacitor 316a is controlled so that a switching voltage (Vm, here) to decide a switching current of the laser diode can be equal to the WAPC reference voltage Vwref.

When the WAPC signal becomes inactive after the switching voltage has become equal to the WAPC reference voltage Vwref, the switch circuit 313 disconnects the photodiode 203 from the WAPC comparator 315. In this case, it is assumed that the active period of the WAPC signal is longer than a time necessary for controlling the switching voltage Vw to be equal to the WAPC reference voltage Vwref by applying/discharging electric charges from the WAPC holding capacitor 316a.

The laser driving voltage Vb subjected to the bias APC and the laser driving voltage Vw subjected to the write APC as described above are converted into laser driving currents by the laser driving current source 317, and supplied through the laser driving current circuit 318 to the laser diode 202a. Here, the laser driving current circuit 318 turns ON/OFF the laser driving current in accordance with the image data signal input from the CPU 1.

The constitution and the operation regarding the laser control circuit 11a have been described. The same holds true for the laser control circuits 11b to 11d.

The bias voltage and the switching voltage are adjusted by the APC during the laser driving as described above. As a result, it is possible to obtain constant laser beam power even when a change in a temperature, a change with time or the like causes a change in output characteristics of the laser diodes 202a to 202d.

However, as described above, when APC of one light source is executed during one scanning at the plurality of light sources of the laser array chip, and APC of a plurality of light source is executed over a plurality of scanning operations, i.e., when one APC operation of one light source is carried out for four scanning operations, a problem occurs. That is, regarding light power in a certain light source, compared with light power of scanning immediately after execution of APC, light power of scanning in which no APC of the light source is executed, for APC of the other light source, is smaller. This problem occurs because a leakage current of the capacitors (312, 316) for holding a voltage value to decide emission power reduces the voltage value. Thus, density nonunifoirmity occurs between the scanning in which the APC is executed and the scanning in which no APC is executed. According to the embodiment, an influence of the light power reduction caused by such a leakage current is reduced by an APC correction section 401 to suppress density nonunifoirmity.

Figure 4:
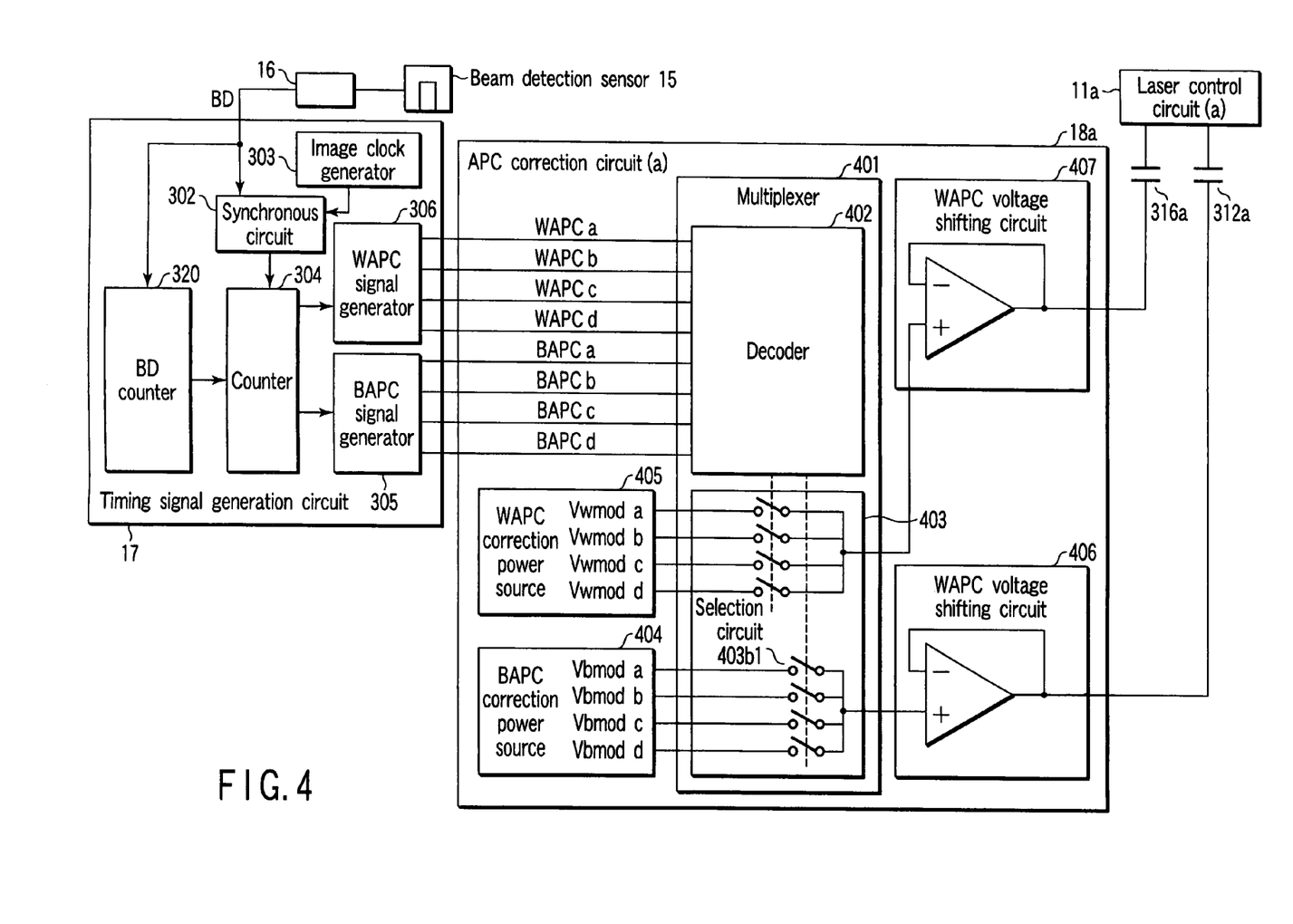
FIG. 4 is a block diagram showing a constitution of an APC correction circuit and a timing signal generation circuit.

FIG. 4 is a block diagram showing a constitution of the timing signal generation circuit 17 and the APC correction circuit 18a.

First, the timing generation circuit 17 will be described.

The beam detection sensor 15 detects a laser beam scanned by the polygon mirror 14, and a BD signal is output from the beam detection circuit 16. A cycle of the BD signal is equivalent to one scanning cycle, generally about several hundred μS. An image clock generated by the image clock generator 303 is synchronized with the BD signal by the synchronous circuit 302. The counter 304 counts a clock number of the synchronized image clock. The BAPC generation circuit 305 makes BAPC signals (BAPCa to BAPCd signals) active (e.g., at a high level) in accordance with a counter value of the counter 304. The WAPC generation circuit 306 makes WAPC signals (WAPCa to WAPCd signals) active in accordance with a counter value of the counter 304.

Figure 5:
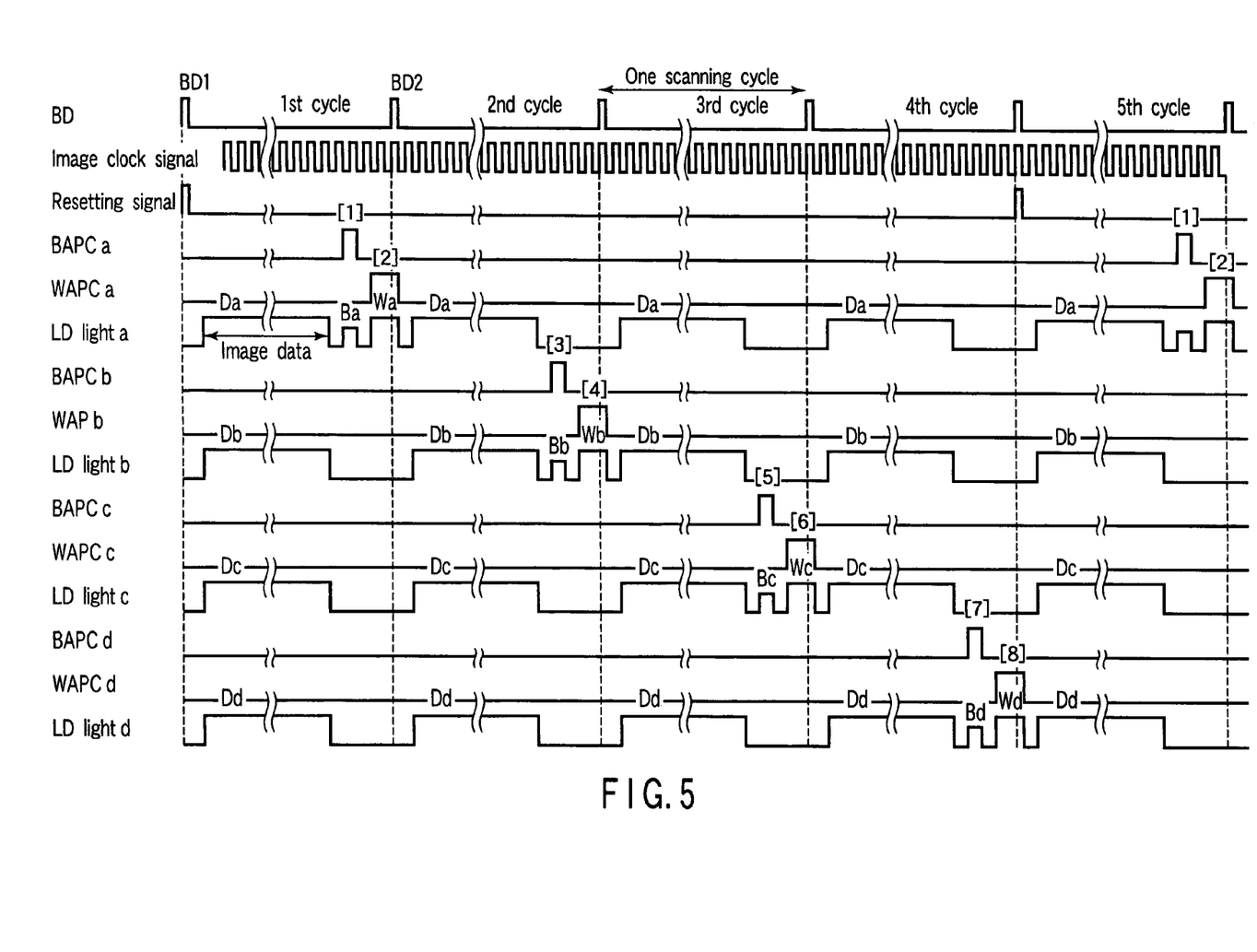
FIG. 5 is a time chart showing an operation of APC according to an embodiment of the present invention.

FIG. 5 is a time chart showing a specific operation of the timing signal generation circuit 17.

A resetting signal is generated by a BD counter 320 each time the BD signal is input four times, and the counter value of the counter 304 is reset to 0. At this time, a counter value of the BD counter 320 is also reset. The counter 304 counts an image clock synchronized with the BD signal. When the counter value of the counter 304 becomes equal to a preset value, the bias APC signal (BAPC signal) generator 305 makes the BAPCa signal active for a given period (period of [1] in FIG. 5), and makes the BAPCa signal inactive when the counter value becomes a value other than the set counter value.

A value of the active period of the BAPCa signal is preset in a register (not shown) of the counter 304 by, e.g., the CPU 1 of FIG. 1. The active period of the BAPCa signal is approximately several μs to 10 μs in accordance with a capacity of the BAPC holding capacitor 312a, one scanning cycle or the like. While the BAPCa signal is active, the aforementioned bias APC is executed by the laser control circuit 202a. During the execution of the bias APC, control is executed in such a manner that the laser diode 202a is forcibly caused to emit a light (power Ba of LD light a in FIG. 5), a laser output is monitored by the photodiode 203, and a bias voltage is adjusted to make constant the laser output at the time of bias emission.

Similarly, when the counter 304 becomes a value other than the preset value, the write APC signal (WAPC signal) generator 306 makes the WAPCa signal active for a given period (period of [2] in FIG. 5). A value of the active period of the WAPCa signal is preset as a counter value in the counter 304. When the counter value of the counter 304 becomes a value equal to the set counter value, the WAPC signal generator 306 makes the WAPCa signal inactive.

A value of the active period of the WAPCa signal is preset in the register (not shown) of the counter 304 by the CPU 1 of FIG. 1. While the WAPCa signal is active, approximately several μs to 10 μs are set in accordance with a capacity of the WAPC holding capacitor 316a, one scanning cycle or the like. While the WAPCa signal is active, the aforementioned write APC is executed by the laser control circuit 11a. During the execution of the write APC, control is executed in such a manner that the laser diode 202a is forcibly caused to emit a light (power Wa of LD light a in FIG. 5), a laser output is monitored by the photodiode 203, and a switching voltage is adjusted to make constant an image writing laser output (power Da of LD light a in FIG. 5) in the image data area. Moreover, the active period of the WAPCa signal of the laser diode 202a overlaps a head portion of next scanning, and a BD signal of a next cycle is generated by forcible emission of the laser diode 202a (tail end of [2] in FIG. 5) when the WAPCa signal is active.

The bias APC and the write APC are carried out in a nonimage area during one scanning cycle. Additionally, in the image data area (partially omitted in FIG. 5), the laser output of the laser diode 202a is turned ON/OFF in accordance with the image data output from the CPU 1.

As described above, the bias APC of the BAPCa signal and the write APC of the WAPCa signal are executed during the scanning of the 1st cycle shown in FIG. 5. In 3rd scanning thereafter, none of BAPCa and WAPCa signals are generated. For a laser beam a, the bias APC (period of [1] in FIG. 5) and the write APC (period of [2] in FIG. 5) are carried out for every four scanning operations.

The timing of the BAPCa signal, the WAPCa signal has been described. Similarly, the BAPCb to BAPCd signals and the WAPCb to WAPCd signals are generated for every three scanning operations in the nonimage area during scanning based on the counter value of the counter 304. The BAPCb to BAPCd signals, the WAPCb to WAPCd signals are made active for every four scanning operations. While these signals are active, bias APC (periods of [3], [5] and [7] in FIG. 5) and write APC (periods of [4], [6] and [8] in FIG. 5) are executed.

Thus, the timing of executing the bias APC and the write APC for every four scanning operations is decided by the value of the BD counter 320. It is assumed that counter values to generate the BAPCb to BAPCd signals, the WAPCb to WAPCd signals are preset as clock speeds in the register of the counter 304.

<APC Correction Method>

Next, an APC correction method will be described by taking the example of the APC correction circuit 18a.

In FIG. 4, the BAPC signal and the WAPC signal generated by the timing signal generation circuit 17 are input to an 8-input and 2-output multiplexer 401 in the APC correction circuit 18a. A decoder 402 in the multiplexer 401 decodes, i.e., discriminates, the signal input from the timing signal generation circuit 17, and changes a switch of a selection circuit 403 in accordance with a result of the discrimination.

The switch of the selection circuit 403 is connected to a bias APC correction power source (BAPC correction voltage source) 404 and a write APC correction power source (WAPC correction voltage source) 405. The selection circuit 403 selects and outputs one of bias APC correction voltages Vbmoda to Vbmodd from the BAPC correction power source 404 and one of write APC correction voltages Vwmoda to Vwmodd from the WAPC correction power source 405. When the switch of the selection circuit 403 is turned ON, the correction voltages are supplied to noninversion input terminals of the BAPC voltage circuit 406 and the WAPC voltage shifting circuit 407 which comprise voltage followers or the like.

For example, when a BAPCa signal (e.g., high level signal) is input from the timing generation circuit 17 to the APC correction circuit 18a, the decoder 402 in the multiplexer 401 discriminates the input of the BAPCa signal, and a switch 403b1 of the selection circuit 403 corresponding to the correction voltage Vbmoda is turned ON. As a result, the correction voltage Vbmoda of the BAPC correction power source 404 is supplied to the noninversion input terminal of the BAPC voltage shifting circuit 406. Similarly, for the BAPCb to BAPCd signals and the WAPCa to WPCAd signals, an input signal is discriminated by the decoder 402, the switch of the selection circuit 403 is turned ON in accordance with the input signal, and a corresponding correction voltage is supplied to the voltage shifting circuit.

The voltage follower that constitutes the BAPC voltage shifting circuit 406 or the WAPC voltage shifting circuit 407 generates an output voltage so that a voltage input to the noninversion input terminal and a voltage input to the inversion input terminal can be equal to each other. Accordingly, the correction voltage supplied to the BAPC voltage shifting circuit 406 after the turning-ON of the switch of the selection circuit 403 is equal to the output voltage of the BAPC voltage shifting circuit 406. Similarly, the correction voltage supplied to the WAPC voltage shifting circuit 407 after the turning-ON of the switch of the selection circuit 403 is equal to the output voltage of the WAPC voltage shifting circuit 407.

The output terminals of the BAPC voltage shifting circuit 406 and the WAPC voltage shifting circuit 407 are connected to the BAPC holding capacitor 312a and the WAPC holding capacitor 316a. Thus, the correction voltage Vbmod can be added to a voltage corresponding to electric charges stored in the BAPC holding capacitor 312a by the APC of the laser control circuit 11a. Similarly, the correction voltage Vwmod can be added to a voltage equivalent to electric charges stored in the WAPC holding capacitor 316 by the APC of the laser control circuit 11a.

In this case, the correction voltage is matched with a voltage equivalent to a leakage current of the holding capacitor during one scanning. The rising of the holding capacitor voltage enables correction of a reduction in the voltage of the holding capacitor caused by the leakage current. As a result, it is possible to suppress a reduction in power of a laser beam even in the case of executing the APC one time for a plurality of scanning operations with respect for a light source.

The correction voltages Vbmoda to Vbmodd, Vwmoda to Vwmodd supplied from the BAPC voltage correction power source 404 and the WAPC voltage correction power source 405 may be input from the outside. In such a case, a change in the leakage current caused by a temperature change, a change with time or the like may be measured from the detected light power of the beam detection sensor 15 by the CPU 1 of FIG. 1, and a correction voltage may be supplied to the BAPC voltage shifting circuit 406 or the WAPC voltage shifting circuit 407.

Figure 6:
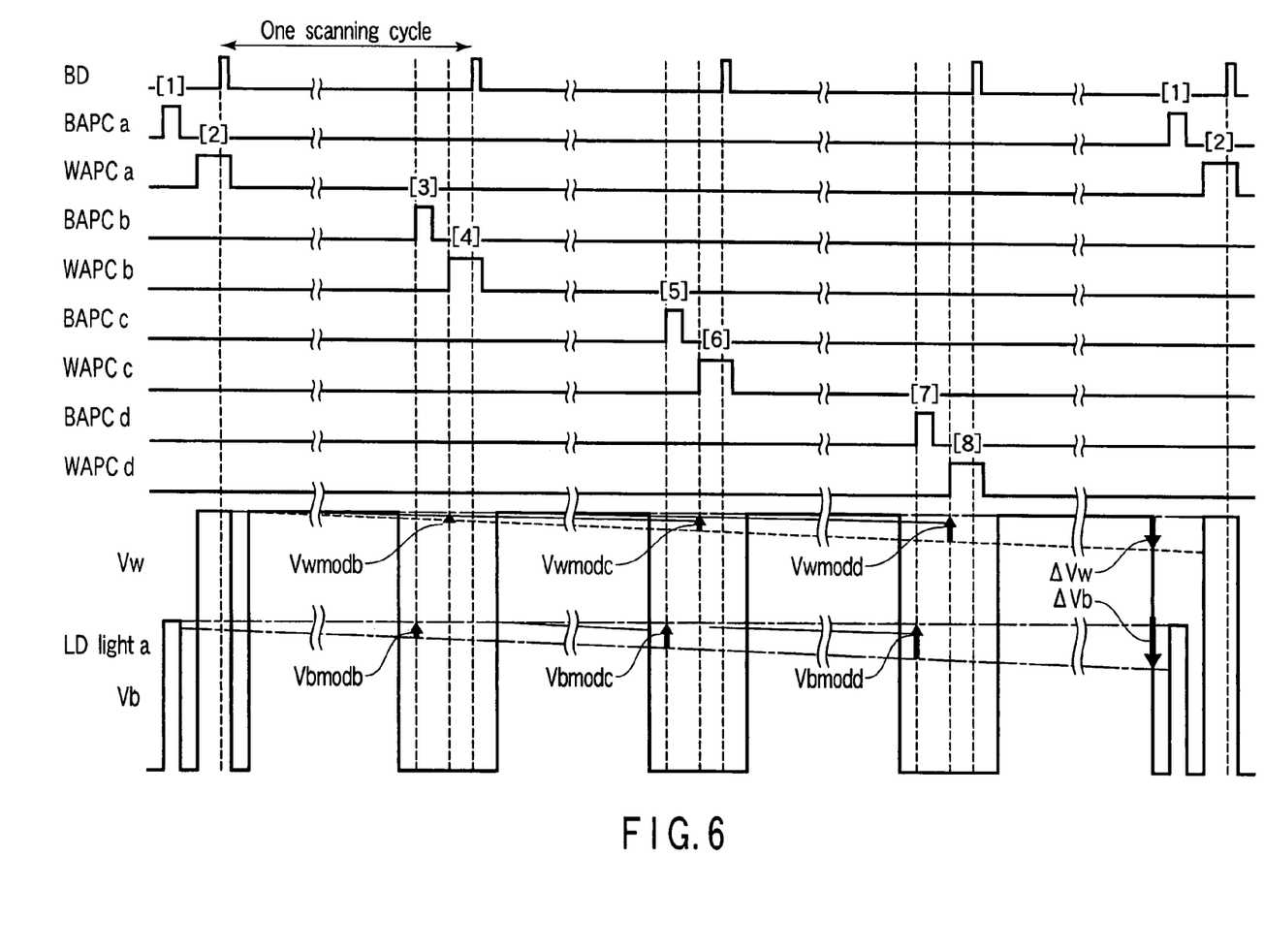
FIG. 6 is a time chart showing operations of APC voltage correction and laser beam power correction according to an embodiment of the present invention.

FIG. 6 is a time chart showing laser beam power correction operation by the APC correction circuit. Incidentally, FIG. 6 shows light power correction of the laser diode 202a (LDa) as an example.

As shown in FIG. 5, the BAPCa to BAPCd signals, the WAPCa to WAPCd signals are generated by one pulse for every four scanning operations ([1] to [8] of FIG. 6). Bias APC, write APC are only executed for every four scanning operations. Accordingly, if a cycle of executing the APC is long, drooping of the BAPC holding capacitor 312, the WAPC holding capacitor 316 becomes large during this cycle, greatly reducing a laser beam by corresponding power. This situation is shown in a lower portion of FIG. 6 based on light power of the laser diode LDa, i.e., Vw which is a terminal voltage of the WAPC holding capacitor 316a, and Vb which is a terminal voltage of the BAPC holding capacitor 316a. A downward arrow $\varDelta$Vb represents a voltage which falls during the four-scanning period of the WAPC holding capacitor 316a, and a downward arrow ⊿b represents a voltage which falls during the four-scanning period of the BAPC holding capacitor 312a.

Thus, according to the embodiment, a correction voltage is added to the applied voltage Vb of the BAPC holding capacitor 312a decided during the bias APC (period of [1] in FIG. 6) of the laser diode 202a. The addition period is while the BAPCb to BAPCd signals are active (periods of [3], [5] and [7] in FIG. 6). Correction voltages are Vbmodb to Vmodd indicated by upward arrows in the drawing.

Similarly, a correction voltage is added to the applied voltage Vw of the WAPC holding capacitor 312A decided during the write APC (period of [2] in FIG. 6) of the laser diode 202a. The addition period is while the WAPCb to WAPCd signals are active (periods of [4], [6] and [8] in FIG. 6). Correction voltages are Vwmodb to Vwmodd indicated by upward arrows in the drawing. Thus, the APC correction voltage is added in addition to the APC voltages of the BAPC holding capacitor 312a and the WAPC holding capacitor 316a.

Figure 7:
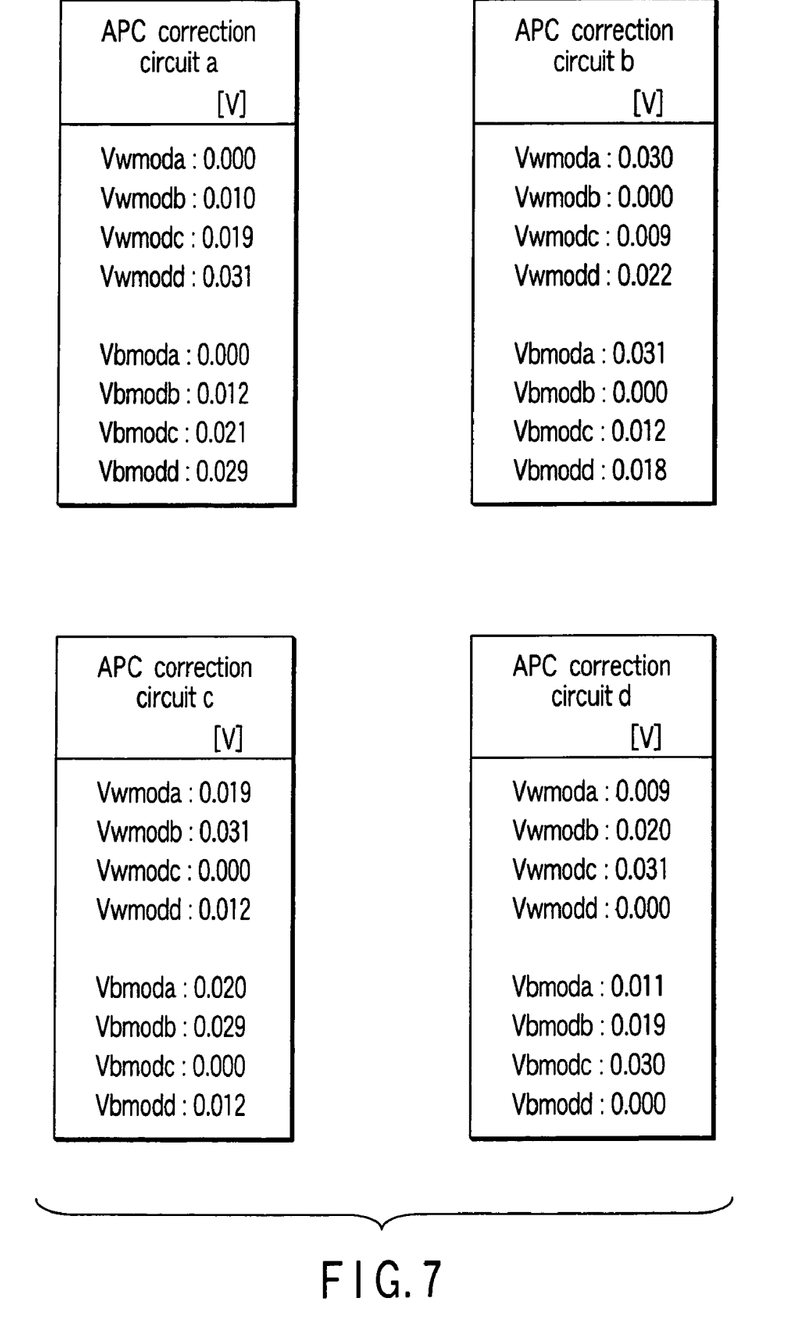
FIG. 7 is a view showing a voltage example of a correction power source applied to each APC correction circuit.

FIG. 7 shows a voltage example of a correction power source applied to each APC correction circuit. Since the periods of APC execution are different among the laser diodes 202a to 202d as shown in FIG. 6, corresponding values of the Vbmoda to Vbmodd and the Vwmoda to Vwmodd in the APC correction circuit 18a to 18d are different from one another. Incidentally, correction voltage of the period of APC for each laser diode which is subjected to APC is 0 V. That is, the Vwmoda and the Vbmoda are 0.000 V at the correction circuit 18a. The Vwmodb and the Vbmodb are 0.000 V at the correction circuit 18b. The Vwmodc and the Vbmodc are 0.000 V at the correction circuit 18c. The Vwmodd and the Vbmodd are 0.000 V at the correction circuit 18d.

Accordingly, even when APC of each light source of the laser array is executed for a plurality scanning operations once, a reduction in a laser beam power caused by the leakage current of the holding capacitor can be suppressed, and occurrence of image density nonunifoirmity can be prevented.

The laser beam power on the basis of the APC voltage correction has been described by taking the example of the laser diode 202a. Light power correction can be similarly carried out for the laser diodes 202b to 202d. The embodiment has been described by taking the example of the 4-beam laser array which has four light sources. The same explanation applies to a laser array which has two or more light sources. Different from the embodiment, the timing of executing the bias APC, the write APC of each beam is not necessarily a scanning interval corresponding to the number of beams. The timing of executing the APC voltage correction is not limited to the timing of the BAPC signal, or the WAPC signal. Furthermore, the invention can be applied to both of an overfill system in which a width of a polygon surface is smaller than that of one scanning, and an underfill system in which a width of the polygon surface is reversely larger.

The above description is the embodiments of the present invention, and the apparatus and the method of the present invention are not limited thereto, and various modified examples can be implemented. Such modified examples are included in the present invention. Further, apparatuses or methods which are configured by appropriately combining the components, the functions, the features, or the steps of the method in the respective embodiments are included in the present invention.

What is claimed is:

1. A light beam scanning apparatus comprising:
   a plurality of light sources which generate laser beams, respectively;
   a detection sensor which detects power levels of the respective laser beams of the plurality of light sources;
   a light power detection circuit which provides the light power levels detected by the detection sensor as detected signals;
   a plurality of capacitors which respectively hold voltages to decide emission power levels of the light sources;
   an emission power control section which compares a value of a light power signal from the light power detection circuit with a predetermined value, adjusts a terminal voltage of the corresponding capacitor based on a result of the comparison, and adjusts a driving current of each of the light sources based on the terminal voltage of the capacitor to control each emission power level of the light sources; and
   a correction section which corrects a reduction in light power of the light source in accordance with a reduction in electric charges applied to each capacitor during a plurality of scanning operations of the laser beam.

2. The light beam scanning apparatus according to claim 1, further comprising a timing signal generation section which generates a timing signal to decide a control period of the light power control section for the plurality of light sources based on a synchronous signal generated by the light power detection circuit, wherein:
   the correction section comprises:
      a decoder which decodes the timing signal generated for the plurality of light sources,
      a correction power source which generates a plurality of correction voltages, and
      a selection circuit which selects one of the plurality of correction voltages in accordance with a decoding result of the decoder to enable supplying of a predetermined voltage to the capacitor.

3. The light beam scanning apparatus according to claim 2, wherein the timing signal generation section comprises a clock generation section, and a counter to count clocks generated by the clock generation section, and generates the timing signal by comparing the count value of the counter with a plurality of predetermined numerical values.

4. The light beam scanning apparatus according to claim 3, wherein the correction section corrects emission power levels of the plurality of light sources for each scanning of the laser beam.

5. The light beam scanning apparatus according to claim 2, wherein the correction power source includes a bias auto power control correction power source which controls a bias current of a laser emission threshold value or less, and a write auto power control correction power source which controls a switching current of laser emission in accordance with image data.

6. The light beam scanning apparatus according to claim 2, wherein the number of correction voltages selectable by the selection circuit is an integral multiple of the number of light sources.

7. The light beam scanning apparatus according to claim 6, wherein one end of the selection circuit is connected to the capacitor.

8. The light beam scanning apparatus according to claim 7, further comprising a voltage shifting circuit disposed between the selection circuit and the capacitor.

9. The light beam scanning apparatus according to claim 1, further comprising a beam scanning portion which scans the laser beams from the plurality of light sources, an optical system of the beam scanning section being an overfill system.

10. The light beam scanning apparatus according to claim 1, wherein the emission power control section controls emission power of one of the plurality of light sources for each scanning of the laser beam.

11. The light beam scanning apparatus according to claim 1, wherein the correction section corrects emission power levels of the plurality of light sources for each scanning of the laser beam.

12. The light beam scanning apparatus according to claim 11, wherein the correction section corrects the emission power levels of the plurality of light sources for each scanning of the laser beam.

13. An image forming apparatus comprising:
a plurality of light sources which generate laser beams, respectively;
a detection sensor which detects power levels of the respective laser beams of the plurality of light sources;
light power detection circuit which provides the light power levels detected by the detection sensor as detected signals;
a plurality of capacitors which respectively hold voltages to decide emission power levels of the light sources;
an emission power control section which compares a value of a light power signal from the light power detection circuit with a predetermined value, adjusts a terminal voltage of the corresponding capacitor based on a result of the comparison, and adjusts a driving current of each of the light sources based on the terminal voltage of the capacitor to control each emission power level of the light sources;
a correction section which corrects a reduction in light power of the light source in accordance with a reduction in electric charges applied to each capacitor during a plurality of scanning operations of the laser beam; and
an image forming section which modulates a laser beam having emission power controlled by the emission power control section, and scans the laser beam to form an image on an image forming medium.

14. The image forming apparatus according to claim 13, further comprising a timing signal generation section which generates a timing signal to decide a control period of the light power control section for the plurality of light sources based on a synchronous signal generated by the light power detection circuit, wherein:

the correction section comprises:
a decoder which decodes the timing signal generated for the plurality of light sources,
a correction power source which generates a plurality of correction voltages, and
a selection circuit which selects one of the plurality of correction voltages in accordance with a decoding result of the decoder to enable supplying of a predetermined voltage to the capacitor.

15. The image forming apparatus according to claim 13, wherein the timing signal generation section comprises a clock generation section and a counter to count clocks generated by the clock generation section, and generates the timing signal by comparing the count value of the counter with a plurality of predetermined numerical values.

16. The image forming apparatus according to claim 14, wherein the correction power source includes a bias auto power control correction power source which controls a bias current of a laser emission threshold value or less, and a write auto power control correction power source which controls a switching current of laser emission in accordance with image data.

17. The image forming apparatus according to claim 14, wherein the number of correction voltages selectable by the selection circuit is an integral multiple of the number of light sources.

18. The image forming apparatus according to claim 13, further comprising a beam scanning portion which scans the laser beams from the plurality of light sources, an optical system of the beam scanning section being an overfill system.

19. A light beam scanning method comprising:
generating laser beams from a plurality of light sources, respectively;
detecting power levels of the respective laser beams of the plurality of light sources;
providing the detected light power levels as detected signals;
holding voltages to decide emission power levels of the light sources, respectively, by a plurality of capacitors;
comparing a value of a light power signal from light power detection circuit with a predetermined value, adjusting a terminal voltage of the corresponding capacitor based on a result of the comparison, and adjusting a driving current of each of the light sources based on the terminal voltage of the capacitor to control the emission power; and
correcting a reduction in light power of the light source in accordance with a reduction in electric charges applied to each capacitor during a plurality of scanning operations of the laser beam.

* * * * *